(12) United States Patent
Kakiuchi et al.

(10) Patent No.: US 7,024,030 B1
(45) Date of Patent: Apr. 4, 2006

(54) IMAGE RECOGNITION DEVICE, IMAGE FORMING DEVICE, AND RECODED MEDIUM

(75) Inventors: Takashi Kakiuchi, Kyoto (JP); Junji Hiraishi, Kyoto (JP); Keitaro Taniguchi, Kyoto (JP)

(73) Assignee: Omron Corporation, (JP)

( * ) Notice: Subject to any disclaimer, the term of this patent is extended or adjusted under 35 U.S.C. 154(b) by 558 days.

(21) Appl. No.: 10/018,749

(22) PCT Filed: Jun. 30, 2000

(86) PCT No.: PCT/JP00/04349

§ 371 (c)(1),
(2), (4) Date: Dec. 21, 2001

(87) PCT Pub. No.: WO01/03417

PCT Pub. Date: Jan. 11, 2001

(30) Foreign Application Priority Data

Jul. 2, 1999 (JP) .................................. 11-188357
Mar. 7, 2000 (JP) ............................. 2000-062134

(51) Int. Cl.
*G06K 9/00* (2006.01)

(52) U.S. Cl. .................................... 382/135
(58) Field of Classification Search ................ 382/135, 382/215, 220, 274; 399/366
See application file for complete search history.

(56) References Cited

U.S. PATENT DOCUMENTS 6,370,271 B1 * 4/2002 Fu et al. ...................... 382/217
6,621,916 B1 * 9/2003 Smith et al. ................. 382/112

FOREIGN PATENT DOCUMENTS

| JP | 62-54392 A | 3/1987 |
| JP | 1-181178 A | 7/1989 |
| JP | 4-373258 A | 12/1992 |
| JP | 6-245064 A | 9/1994 |
| JP | 6-251128 A | 9/1994 |
| JP | 07-212584 A | 11/1995 |
| JP | 9-259277 A | 10/1997 |
| JP | 10-063789 A | 3/1998 |

OTHER PUBLICATIONS

Machine translation of JP 09-259277 A.*

* cited by examiner

*Primary Examiner*—Andrew W. Johns
(74) *Attorney, Agent, or Firm*—Dickstein Shapiro Morin & Oshinsky LLP

(57) ABSTRACT

Fluctuation information produced by a fluctuation producing portion (36) is superimposed on given image data by a fluctuation superimposing portion (35). The superimposed image data where the fluctuation information is superimposed is subjected to an image recognition process by an image recognition portion (37). The results of the image recognition are sent to a printer body through a recognition result outputting portion (39). Even if the given image data is the same, fluctuation is superimposed, and therefore the image data on an object to be recognized is altered. As a result, the possibility of a recognition error is suppressed as much as possible.

7 Claims, 6 Drawing Sheets

IMAGE RECOGNITION DEVICE, IMAGE FORMING DEVICE, AND RECODED MEDIUM

TECHNICAL FIELD

The present invention is related to an image recognition device, an image forming device, and a recording medium. More specifically, the present invention is related to technology which makes it possible to effectively suppress the output of prohibited output items.

PRIOR ART TECHNOLOGY

In prior art image processing systems for opposing the counterfeiting of banknotes, valuable securities and the like, various devices have been proposed and implemented in closed systems, such as color copying machines, from image input to image formation. In this case, in such closed systems, a recognition is carried out using data read out from the genuine document (prohibited copying item such as a banknote or the like) in the image input portion, and using these results the output is stopped in the image formation device.

On the other hand, as for the fate of such recognition technology, it is impossible to avoid the problem of mis-recognition. This mis-recognition includes two situations comprised of the case where it is not possible to carry out recognition in spite of the fact that an image is a detection object, and the case where an image that is not a detection object is mistakenly recognized as a detection object. To take a prohibited copying item such as a banknote or the like as an example, there is the case where a copying process is tried for a banknote placed on the document support base and a copying output is carried out without it being possible to recognize the banknote (former case), and the case where, when attempting to copy an ordinary document that is not a banknote, a normal copying process is prohibited because the image is mis-recognized as a banknote (latter case).

Further, because the recognition process for a detection object such as a banknote or the like originally adjusts the recognition algorithm for recognizing such banknote or the like, the probability of a recognition omission is low even when there are slight changes or the like of the image. In this regard, there is a great variety of images which are not detection objects, and it is substantially difficult to construct algorithms and knowledge that can consider all of these in advance and not carry out recognition. Accordingly, with regards to the kinds of mis-recognition described above, the latter case where an image that is not a detection object is recognized as a detection object has a higher probability of occurring.

Further, in the case of an image that is not such detection object, by trying to carry out copying one more time, or by carrying out a process (evasive measure) such as redoing the placement of the document and carrying out copying again or the like, there are many situations where it will be possible to correctly judged that the image is not a detection object, whereafter copying will finally be allowed. In this regard, because the object that is mis-recognized is generally different than the object that has undergone tuning for correctly carrying out recognition, most mis-recognitions occur at the branching point of a subtle judgment. Accordingly, due to such factors as dispersion of each document scan of the copying machine, the occurrence of a quantization error at the time of digital processing and the like, there are many situations where only a slight change of the input image will cause the judgment conditions to become unrealized. Further, even when such evasive measure is carried out for a detection object such as a banknote or the like, and even when there are slight changes and the like of the image, it is possible to carry out recognition.

For this reason, in a closed image processing system such as a copying machine or the like, the act of carrying out a process such as retrying copying a plural number of times or redoing the placement of the document or the like will have almost no adverse effect on correct recognition, and this forms an evasive measure only for mis-recognition.

On the other hand, with the advent of high-performance, low-cost image scanners, personal computers, printers and the like in recent years, counterfeiting on open systems has become a social problem. Namely, a genuine document is read in using an image scanner, and this read-in image data is stored in a personal computer. Then, the image data stored in the personal computer is supplied to a color printer. Then, this color printer forms images for output based on the received image data, and carries out a printout.

In such case, the image data stored in the personal computer can be sent from a scanner connected to the personal computer, acquired via communication, or supplied via a recording medium such as a FD, MO or the like. Accordingly, in this type of open system, image formation of image data having unknown origin is frequently carried out, and in such cases it is also necessary to stop outputs.

In one example method of stopping such improper outputs in open systems, the recognition device provided in prior art color copying machines or one of other various recognition devices is installed in an image formation device such as a printer or the like. However, when this is done, the same problem of mis-recognition described above will occur.

Further, in order to solve such problem, the evasive measure in the copying machine described above can not be applied as is. Namely, the input of a color printer is not an object like a document for a copying machine, but is instead printer data in the form of electronic information. In other words, a document which is a physical object needs to first undergo conversion into electronic information in order to carry out copying. Accordingly, in the case of a copying machine, by redoing the placement of the document or the like at the time of such conversion, it can be expected that a dispersion will be created in the electronic information due to the main cause described above. However, the printing data is already converted into electronic information, and even when printing is tried again, the electronic information sent to the printer will remain completely unchanged.

For this reason, mis-recognitions will occur in color printers provided with an improper copying prevention device that uses image recognition, and even when an image is originally capable of being outputted, there are situations where such image will be recognized as a prohibited output item, and when a normal output is prohibited, thereafter, no matter how many times an output is retried for the same image, the result will be the same (i.e., a normal output will be prohibited). This arrangement not only causes needless stress for the user, but also places an excessive load on user support, and results in an increased cost for the product itself.

It is an object of the present invention to provide an image recognition device, an image forming device, and a recording medium which make it possible to receive data that has undergone electronic information conversion, reduce the probability of mis-recognition even in the case where a recognition process is carried out on such data, and recognize that an image is not a detection object in the case where the image is not a detection object when a recognition process is carried out at least a plurality of times on the same image data.

SUMMARY OF THE INVENTION

The image recognition device according to the present invention is constructed so as to be equipped with a fluctuation producing portion which produces fluctuation information for changing recognition results, and an image recognition portion which carries out an image recognition process on supplied image data by taking into account the fluctuation information produced by said fluctuation producing portion.

As an example of specific solution means, the image recognition device is equipped with a fluctuation superimposing portion which superimposes fluctuation information produced by a fluctuation producing portion onto supplied image data, an image recognition portion which carries out an image recognition process on the superimposed image data having fluctuation information superimposed thereon created by said fluctuation superimposing portion, and an output portion which outputs recognition results of said image recognition portion.

Further, as other solution means, the image recognition device is constructed so as to be equipped with a recognition dictionary for carrying out an image recognition process on supplied image data, a fluctuation superimposing portion which superimposes fluctuation information produced by a fluctuation producing portion onto said recognition dictionary, an image recognition portion which carries out an image recognition process on said supplied image data based on the fluctuation recognition dictionary created by the fluctuation superimposing portion, and an output portion which outputs recognition results of said image recognition portion.

Of course, the present invention is not limited to the structures described above, and so long as fluctuation information is produced and an image recognition process is carried out based on such produced fluctuation information, the fluctuation information may be used anywhere, and other various methods may be employed.

Further, the recording medium according to the present invention is a recording medium which can be read by a computer and which stores a program that enables the computer to execute a fluctuation producing process which produces fluctuation information for changing recognition results, a process which acquires image data of a recognition object, a process which reads out a recognition dictionary for carrying out an image recognition process, and an image recognition process which is carried out on the acquired image data by taking into account said read out recognition dictionary and said produced fluctuation information.

In the case such as where image data that has undergone electronic information conversion is received and an image process such as a printout or the like is carried out, image data of the same image will be the same no matter how many times reception is carried out. However, for example, when a fluctuation is superimposed on the received image data, only the fluctuation portion will change in the image data that forms the recognition processing object supplied to the image recognition portion. Similarly, when a fluctuation is superimposed on dictionary data that forms the source at the time a recognition process is carried out, the dictionary data will change even when the image data that forms the recognition processing object is the same. Further, in addition to these arrangements, by taking the fluctuation information into account, one portion of the image data of the processing object may be thinned out or supplemented to change the dimensional shape, whereby the image data of the actual recognition object is changed.

Accordingly, there are different recognition results for the same image data. Namely, even if an image that is not a detection object is mistakenly recognized as a detection object, when the present image recognition device carries out a recognition process on the image data a plurality of times, the fluctuation described above makes it possible to make the normal judgment that the image is not a detection object. On the other hand, in the case of a detection object, because a recognition process is carried out with the features for detecting the detection object originally held in the dictionary, it is possible to recognize a detection object even when there is a slight fluctuation.

Further, the "fluctuation" may be superimposed on all of the supplied image data or recognition dictionary data, or superimposed on a portion thereof. Further, the recognition results of the "image recognition portion" may be something that outputs judgment results of the matchability or similarity or the like with the detection object, or judgments up to the judgment of whether or not an image is a detection object can be carried out, and then such judgment results may be outputted. Further, in the case where judgments up to the judgment of whether or not an image is a detection object are carried out, the fluctuation is not taken into account in the processes up to the calculation of the matchability or the like, and by fluctuating the reference value used when carrying out such final judgment, it is possible to form a recognition process that takes fluctuation information into account in accordance with the present invention.

Namely, in the case where an image recognition process is carried out on the same image data (electronic information) a plurality of times, when the image data of the processing object is not a detection object but forms an image that resembles the detection object, the effect of the fluctuation information creates a different final judgment result of whether or not the image is a detection object, and this forms the present invention.

Further, the image forming device according to the present invention is equipped with a device main body which carries out a prescribed image conversion process on supplied image data information, and carries out a prescribed printing process, wherein a prescribed image recognition device is provided, image data inputted into the image forming device is inputted into said device main body and said image recognition device, and the suitability of a normal output of said device main body is judged based on recognition results of said image recognition device.

In this way, it is possible to reliably prohibit a normal output for prohibited output items. Further, even if an image that is not a prohibited output item is mistakenly recognized as a prohibited output item and a normal output prohibition process is received, by executing printing a number of times, the effect of the "fluctuation" makes it possible to recognize that the image is not a prohibited output item, and a normal output is carried out.

PREFERRED EMBODIMENTS OF THE INVENTION

The present invention will be described in detail with reference to the appended drawings.

Figure 1:
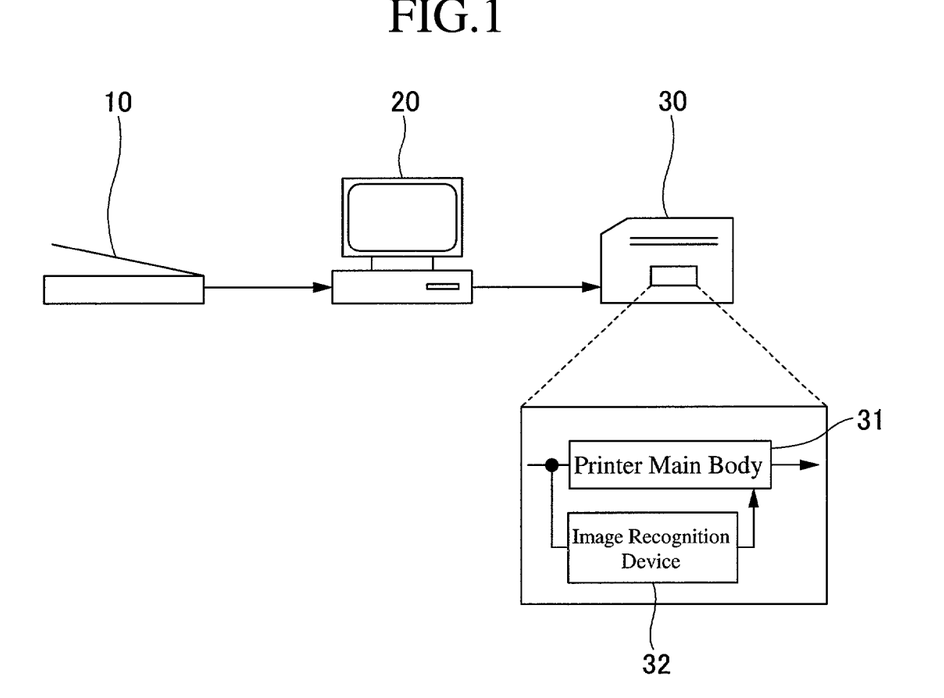
FIG. 1 is a drawing showing an image processing system in which the present invention is provided.

FIG. 1 shows the schematic structure of an image processing system to which the present invention is applied. As shown in the drawing, the document to be read is imaged using a scanner 10 and image data is uptaked. The uptaked image data is transmitted to the main portion of a personal computer 20, and uptaked in an internal/external storage device of the personal computer 20. This personal computer 20 also serves as a print server and the like for a simple copying machine.

Further, a printer 30 which is an image forming device is connected to the personal computer 20, and after being edited by photo retouching software or the like, or with no editing being carried out, the image uptaked in the personal computer 20 is outputted to the printer 30 for image formation, and then a printout can be carried out by printing onto a blank sheet.

Further, the final output of prohibited copying items such as banknotes and the like (prohibited output items) should be prevented, and the printer 30 is equipped with a printer main body 31 which has the essential function of a printer for carrying out printout, and an image recognition device 32, wherein the image recognition device 32 carries out a prescribed recognition process on image data supplied from the personal computer 20, calculates the matchability indicating the probability of a specific pattern printed on a prohibited output item, and then sends such matchability to the printer main body 31.

Then, in the printer main body 31, in the case where the received matchability is above a prescribed threshold value, the image data currently waiting to be outputted is judged to be a prohibited output item, and a prescribed output prohibition process is carried out. Various methods can be employed for this output prohibition process, such as painting a certain color over the entire sheet, carrying out printing with a warning message superimposed thereon, or cutting off the power supply to stop the output process itself, or the like.

Further, as for the output from the image recognition device 32, instead using the matchability in the manner described above, the image recognition device 32 may carry out judgments up to the judgment of whether or not an image is a prohibited output item based on the matchability, and then a prohibition command may be outputted in the case where an image is judged to be a prohibited output item. Furthermore, the relationship between the image recognition device 32 and the printer main body 31 described above can be the same as the relationship between the image recognition device in a prior art copying machine and the copying machine main body.

Figure 2:
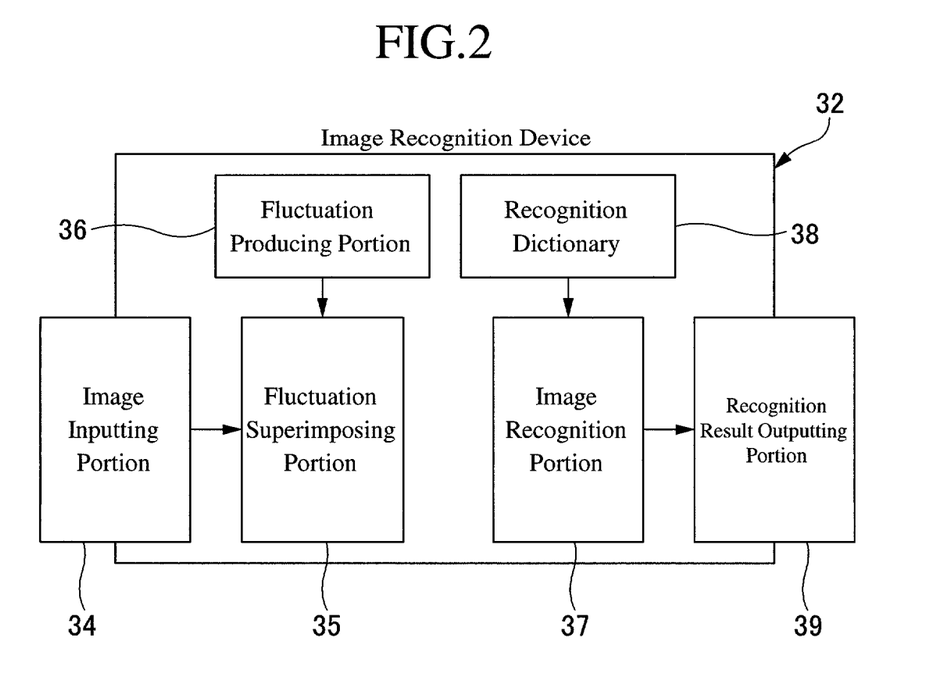
FIG. 2 is a drawing showing a first embodiment of an image recognition device according to the present invention.

In this regard in the present invention, the image recognition device 32 is constructed as shown in FIG. 2. Namely, image data uptaked via an image inputting portion 34 is supplied to a fluctuation superimposing portion 35, wherein superimposed image data is created by superimposing fluctuation data created by a fluctuation producing portion 36 onto the image data. This superimposed image data is supplied to a next-stage image recognition portion 37. The image recognition portion 37 carries out an image recognition process on the supplied superimposed image data based on dictionary data stored in a recognition dictionary 38. Namely, the probability (matchability) of a detection object is calculated, and the result is supplied to a recognition result outputting portion 39, and then the result is outputted to the printer main body 31 via the recognition result outputting portion 39.

When constructed in this way, for example even if the image data uptaked via the image inputting portion 34 is the same, because fluctuations are superimposed on such image data, only the fluctuation portions of the image data undergoing a recognition process by the image recognition portion 37 will change. Accordingly, in the case of a detection object, it is possible to recognize the detection object even when there is a slight fluctuation, and in the case where an item is not a detection object, for example even in the case where a detection object is mis-recognized one time, by trying to carry out a printout again, the "item is not a detection object" judgment will be correctly carried out, and then printout will become possible.

Figure 3:
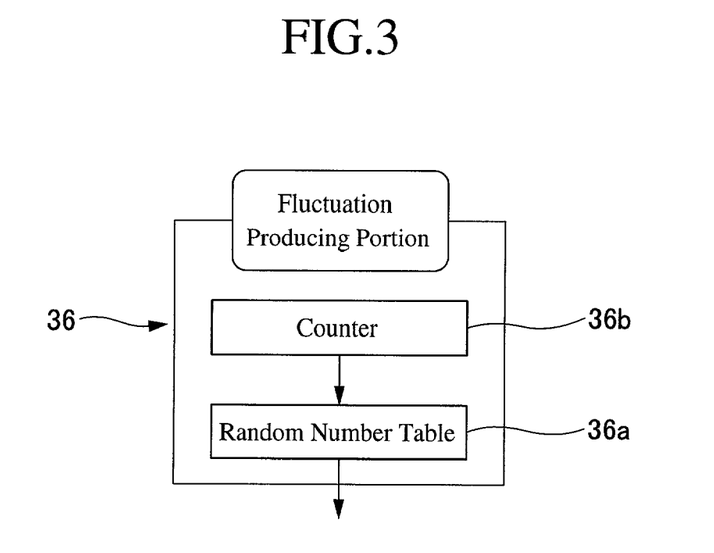
FIG. 3 is a drawing showing the internal structure of a fluctuation producing portion.

Now, the specific functions of each device described above are as follows below. The fluctuation producing portion 36 produces an adequately strong fluctuation (fluctuation information), and as shown in FIG. 3, the internal structure thereof includes a random number table 36a which stores a list of random numbers in the form of a table, and a counter 36b which refers to such random number list. In this way, the fluctuation is determined based on random numbers from a table referenced by the counter 36b, and this fluctuation (value) is supplied to the fluctuation superimposing portion 35. In this regard, in the present example, any value within the range ±7 is used.

Further, in the present embodiment, the random numbers are stored in advance in the form of a table, but the present invention is not limited to this arrangement, and it is of course possible to provide a random number generator that uses an algorithm such as, for example, a linear congruence method, M-series sequence or the like.

Figure 4:
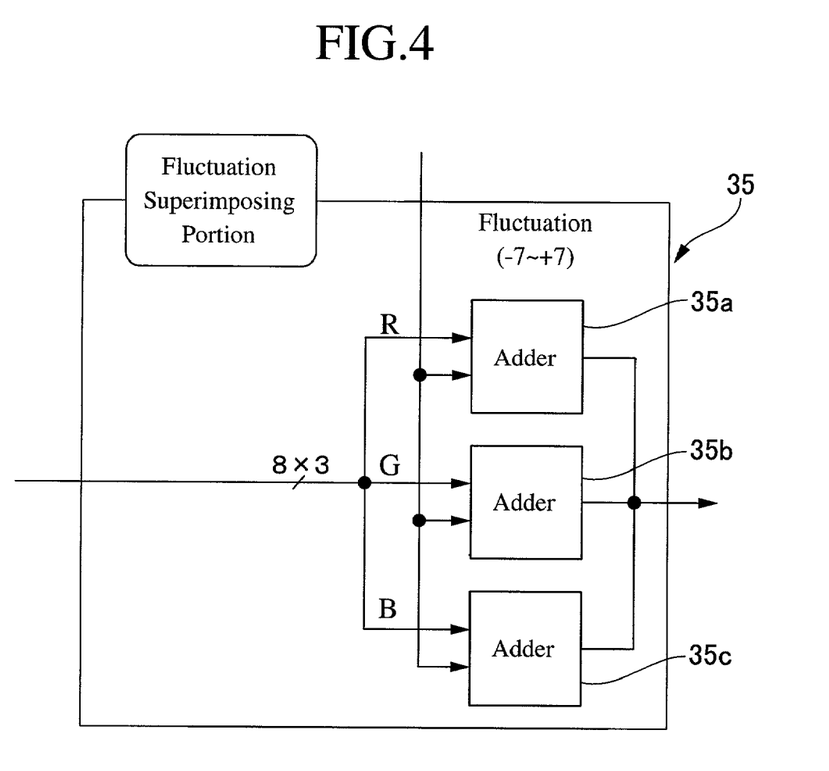
FIG. 4 is a drawing showing the internal structure of a fluctuation superimposing portion.

As shown in FIG. 4, the fluctuation superimposing portion is equipped with adders 35a~35c which add the fluctuation supplied from the fluctuation producing portion 36 to each color data of RGB supplied via the image inputting portion 34. Namely, the fluctuation value (fluctuation information) is simply added to each pixel density supplied in order. Further, although it also depends on the function of the fluctuation producing portion 36, the fluctuation value may be used in common (the same value is added to the RGB data for the same pixel) by each pixel unit, or a fluctuation value may be established for each RGB data.

Further, in the present embodiment, although a simple addition is carried out for the pixel density as described above, various other methods can be employed, such as using color signals and brightness signals, or using discrete cosine conversion or the like to superimpose only on a specific frequency component, or the like. Further, the specific superimposing method is not limited to the simple addition described above, and it is possible to use various methods such as various operations involving the four rules of arithmetic or bit operations, or the like. In short, the fluctuation is supplied, and even when the input image data is the same, it is possible to make the image data undergoing image processing become different.

Figure 5:
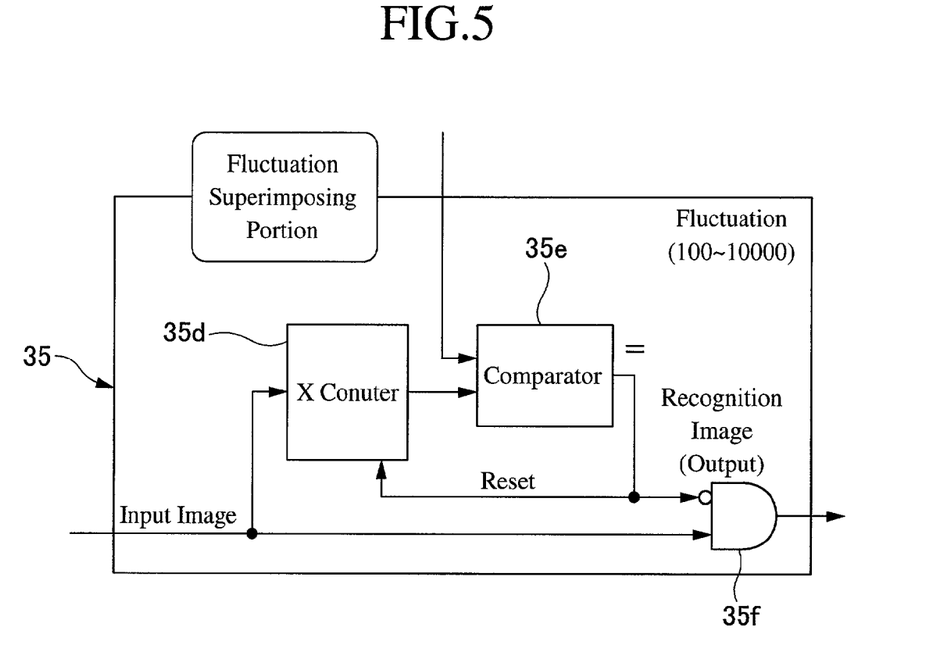
FIG. 5 is a drawing showing another example of the internal structure of a fluctuation superimposing portion.

Further, instead of the structure described above, the fluctuation superimposing portion 35 can be constructed as shown in FIG. 5 for example. Namely, in the present embodiment, the fluctuation superimposing portion 36 outputs a value anywhere in the range 100–10,000 in accordance with the same principle described above. Further, this value anywhere in the range 100~10,000 forms fluctuation information X, and the fluctuation superimposing portion 35 thins out one pixel portion of the main scanning direction at the rate of one cycle for X cycles. In this way, the dimensional shape of the item that does not have different density values (color information) of each pixel undergoes a minute reduction within the range 0.01~1%. Namely, the size and shape of the recognition object changes each time (the pixel arrangement is disarranged), and this changes the image data of the recognition object.

Now, as for the specific structure for carrying out such process, first, an x counter 35d is provided to count the number of pixels of the x direction (main scanning direction) of the input image, and this count value is supplied to a comparator 35e. The comparator 35e is supplied with the fluctuation information (the value X anywhere in the range 100–10,000) produced by the fluctuation producing portion 36, and outputs a detection signal when two inputs match each other. In this way, a pulse is outputted from the comparator 35e at the rate of one cycle for X cycles for the count value (the number of pixels of the main scanning direction) of the x counter 35d.

This output of the comparator 35e is supplied to a reset terminal of the x counter 35d, and one terminal (reverse input terminal) of an AND element 35f. Further, the other terminal of the AND element 35f is supplied with the input image.

In this way, normally, because the output of the comparator 35e is Low, the output of the AND element 35f is the same as the input image. Then, when a pulse is outputted from the comparator 35e at the rate of one cycle for X cycles, the input image at such time is not outputted, and the count value of the x counter 35d is reset. Further, the present invention is not limited to an arrangement for reducing in this way, and it is possible to employ various methods such as enlarging, rotating, inclining, deforming (parallelogram) or the like.

The image recognition portion 37 can include certain various recognition algorithms from the prior art, and in addition to cross-correlation and template matching and the like, it is possible to use various recognition methods. Further, in accordance therewith, the dictionary data stored in the recognition dictionary 38 also corresponds to the recognition algorithm, and this forms a dictionary suited to detection objects (prohibited output items). Furthermore, when the dictionary is matched with the recognition algorithm, it is of course necessary to establish a range of fluctuation values produced by the fluctuation producing portion 36 described above.

Namely, in the present embodiment, because a fluctuation is supplied for the images of the recognition processing object supplied to the image recognition portion 37, even when the same image data is supplied to the printer 30 and the image inputting portion 34 for example, the image data supplied to the image recognition portion 37 will be different (the amount of change is small due to the "fluctuation").

Accordingly, for example, when attempting to print out normal image data that is not a prohibited output item, even if the image recognition portion 37 mistakenly recognizes (mis-recognizes) a prohibited output item, in the case where a printout of the same document is attempted again, from the fact that the fluctuation is superimposed, the recognition object image in the image recognition portion 37 will be different than the previous mis-recognized image, and this makes it possible to recognize that the image is not a prohibited output item, whereby a normal output is allowed. Of course, there is a possibility that a mis-recognition will occur two consecutive times, but from the fact that the recognition object will be different due to the fluctuation, by trying to carry out printing a number of times, it becomes possible to carry out a normal output.

On the other hand, in the case of a prohibited output item such as a banknote or the like, even when the fluctuation is superimposed and the image data of the recognition image object fluctuates slightly, there are changes in the read document itself which forms the source due to folds and the like that arise over time on banknotes and the like in the first place, and because the recognition algorithm and dictionary can be made to cope with such changes, it is possible to carry out detection without receiving adverse effects of the fluctuation described above, and a normal output can be prohibited.

Figure 6:
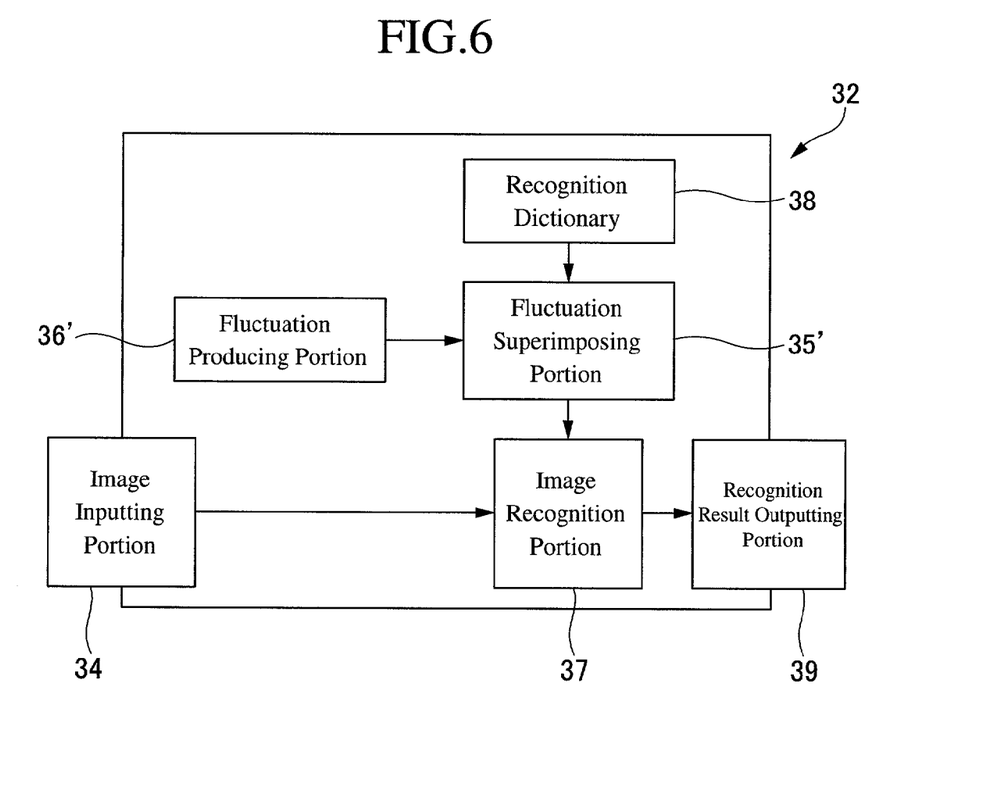
FIG. 6 is a drawing showing a second embodiment of an image recognition device according to the present invention.

FIG. 6 shows the essential portion of a second embodiment of the present invention. In the first embodiment described above, a fluctuation was supplied to the image data of the recognition object, but in the present embodiment, a fluctuation is supplied to the dictionary data supplied to the recognition process function portion, more specifically the image recognition portion 37.

Namely, the output of the image inputting portion 34 is supplied without alteration to the image recognition portion 37. Then, as for the dictionary data supplied to the image recognition portion 37, a fluctuation produced by a fluctuation producing portion 36' is superimposed by a fluctuation superimposing portion 35' onto dictionary data stored in the recognition dictionary 38 to create fluctuation dictionary data, and this fluctuation dictionary data is supplied to the image recognition portion 37.

As for the fluctuation producing portion 36', it is possible to use basically the same elements as those of the fluctuation producing portion 36 and its modifications in the first embodiment. Further, the range of fluctuation values in the present embodiment is ±7, which is the same as that of the first embodiment, but it is of course possible to change this range depending on the dictionary recognition algorithm and the like.

Figure 7:
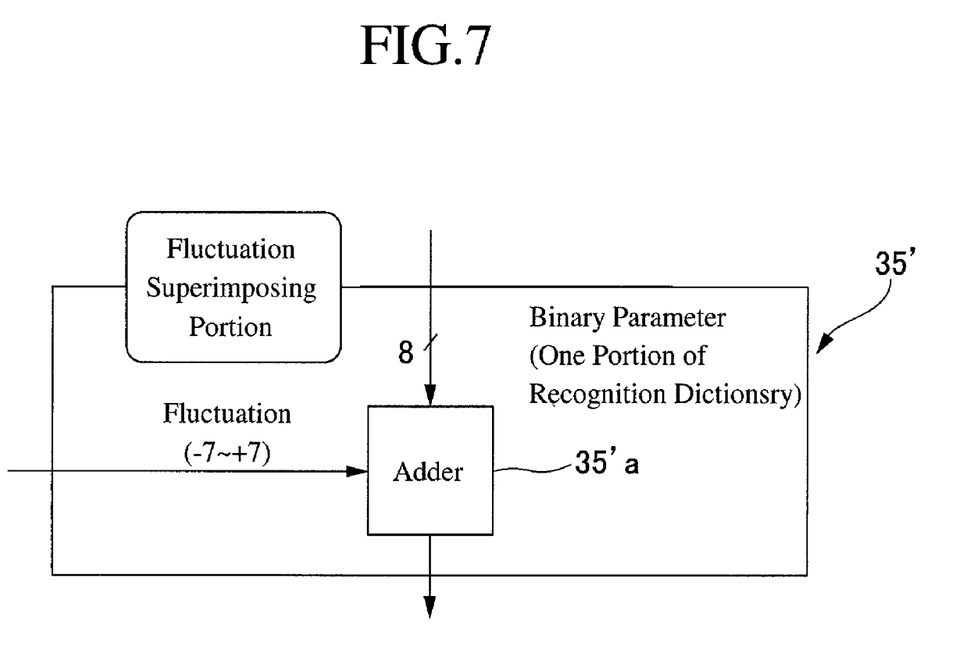
FIG. 7 is a drawing showing the internal structure of a fluctuation superimposing portion.

Further, because the superimposing object is a dictionary, it is possible for the fluctuation superimposing portion 35' to add a specific parameter, for example a threshold value (a value represented by 8 bits for 256 gradations) at the time the image undergoes binary conversion. Namely, as shown in FIG. 7, a binary parameter (threshold value) supplied from the recognition dictionary and a fluctuation value supplied from the fluctuation producing portion are supplied to an adder 35'a, wherein both of these are added together, and then the result of such addition is supplied as a binary parameter to the image recognition portion 37. Of course, the parameter that is added is not limited to a binary threshold value.

Further, in the fluctuation superimposing portion 35', the fluctuation may be added to all of the dictionary data supplied from the recognition dictionary 38, or the fluctuation may be added to only one portion of the dictionary data. In such case, one portion of the dictionary data outputted from the recognition dictionary 38 is bypassed or sent through.

Then, the image recognition portion 37 compares the feature quantity (dictionary data) of the recognition object image and the feature quantity of the input image, and because the similarities and differences thereof are judged, whichever element the fluctuation is added to, an equivalent meaning will be held. Consequently, the present embodiment also achieves the same operational effect as that of the first embodiment, and prohibited output items such as banknotes and the like can be reliably recognized even when a printout is attempted a number of times, whereby a normal output is stopped. Further, in the case where an image is not a prohibited output item, by trying to carry out a printout at least several times, mis-recognition can be avoided, and a normal output becomes possible.

In both of the embodiments described above, the image recognition device was provided in an image forming device such as a printer or the like, but it is also possible to install the image recognition device as a printer driver or the like, or as driver of a peripheral device, wherein an image recognition algorithm is provided in such driver. Namely, the image recognition device of the present embodiments includes of course the case of being internally provided inside an image processing device which utilizes recognition results, and also includes the case of being provided outside the image processing device such as when the image processing device is a peripheral device and the image recognition device is provided inside a computer.

Furthermore, in the embodiments described above, the programs and system were previously described with regard to the image recognition device (e.g., these are applied to an expansion board or the like, or recorded inside an IC of a ROM or the like in order to create a complete unit in the form of a device). However, the present invention is not limited to only a complete unit that forms a device in this way, and it is also possible, for example, to create programs for a computer to execute each of the processes described above, and then such programs can be supplied by being recorded on a prescribed recording medium.

Figure 8:
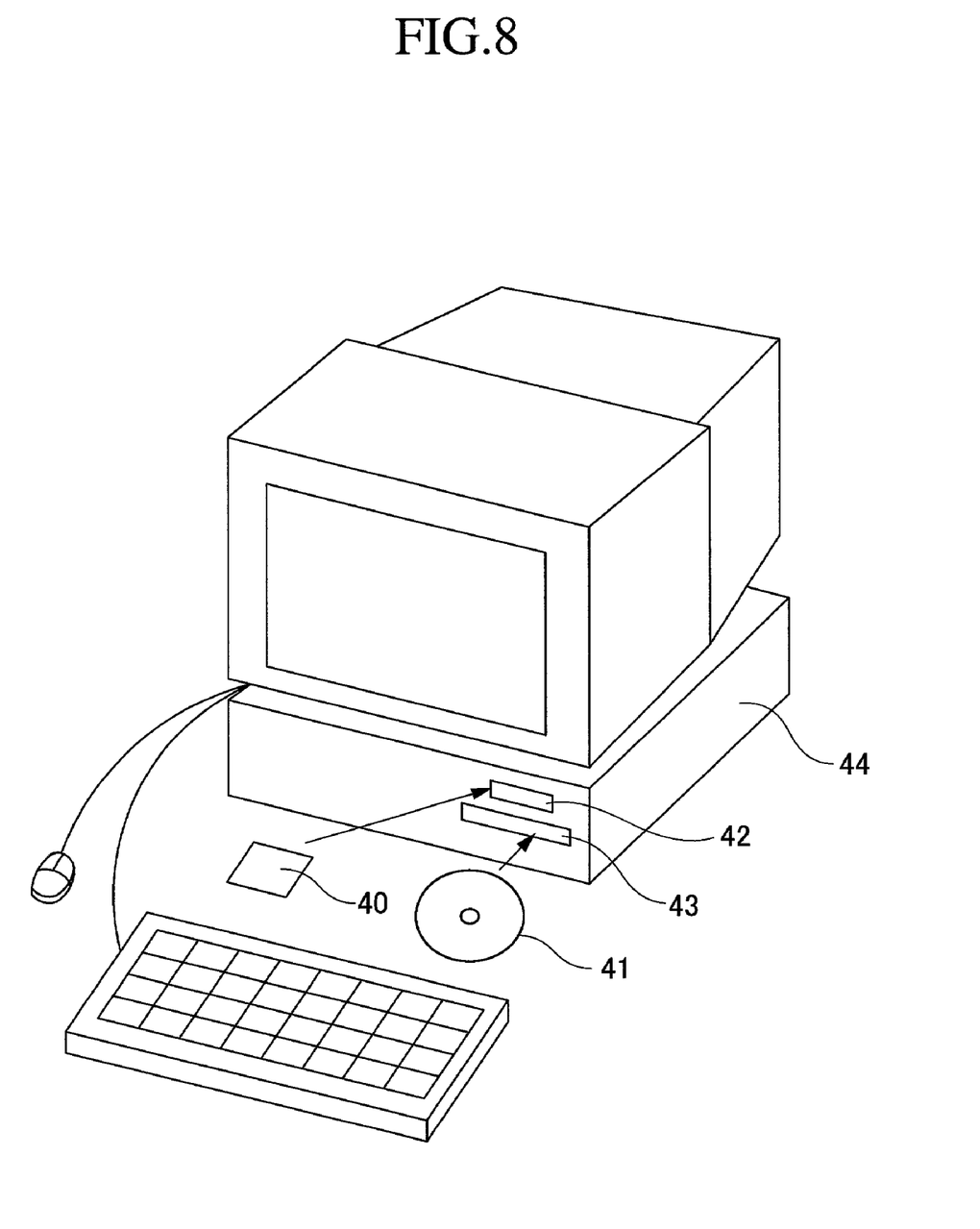
FIG. 8 is a drawing showing a system structure for implementing the recording medium according to the present invention.
Figure 9:
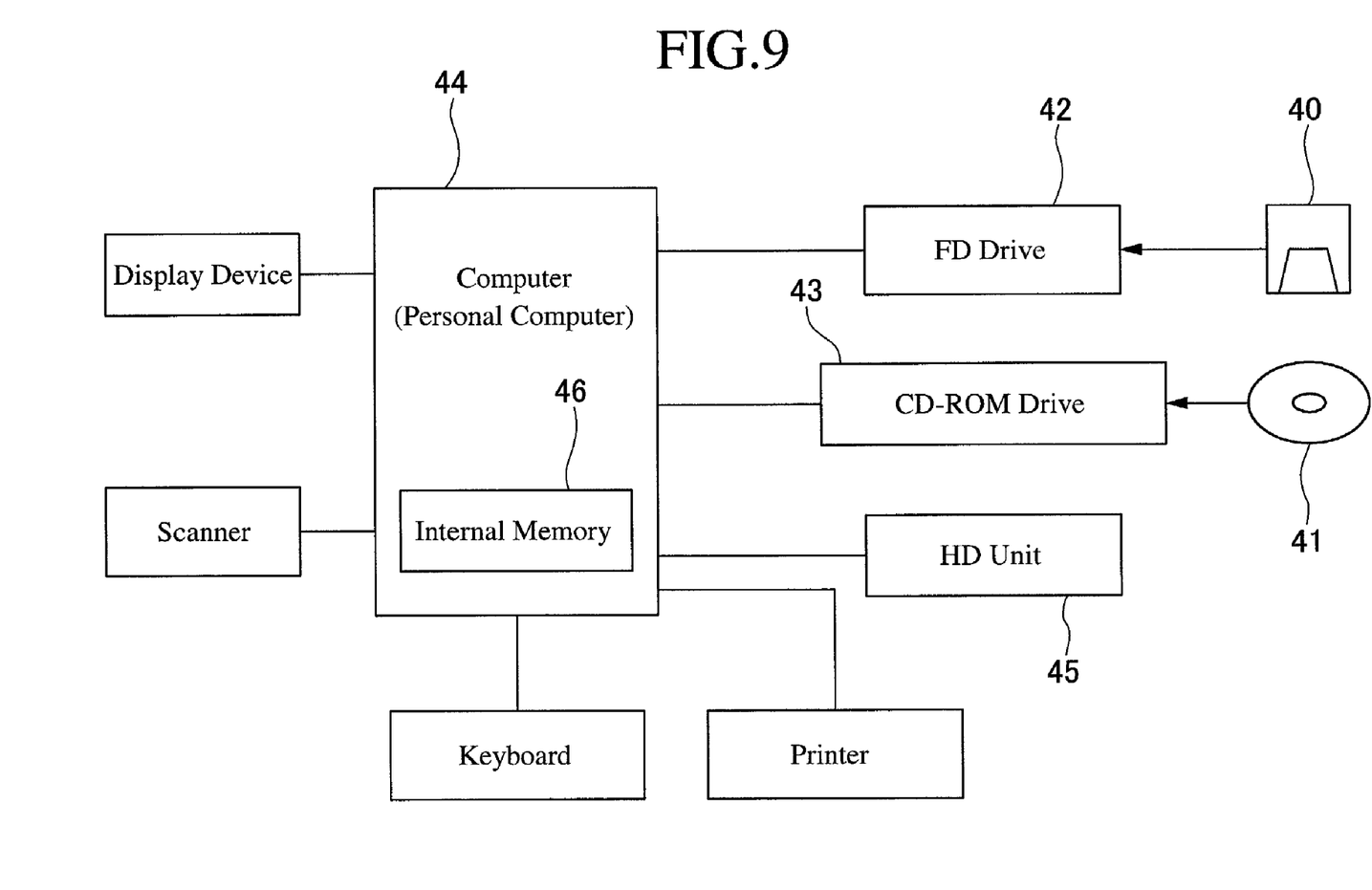
FIG. 9 is a drawing showing a system structure for implementing the recording medium according to the present invention.

Namely, the recording medium is a floppy disk (FD) 40 or CD-ROM 41 or the like, and the programs recorded on such recording medium are installed via a FD driver 42 or a CD-ROM driver 43 into an HD unit 45 connected to (internally provided in) a computer (personal computer) 44, and in this way, the computer 44 constructs the device described in the embodiments described above.

Further, it is also possible to install the image recognition device as a printer driver or the like, or as driver of a peripheral device, wherein an image recognition algorithm is provided in such driver. Namely, the image recognition device of the present embodiments includes of course the case of being internally provided inside an image processing device which utilizes recognition results, and also includes the case of being provided outside the image processing device such as when the image processing device is a peripheral device and the image recognition device is provided inside a computer.

Further, by having the computer execute the installer stored on the recording medium 40, 41, it is possible to install all of the recognition program or a portion thereof into a peripheral device. Namely, the reading capabilities of the computer include of course the case where installation is carried out in the computer itself, and also includes the case where the program read by the computer is installed in a peripheral device.

Furthermore, in the case where a device for reading a recording medium such as a FD drive, CD-ROM drive or the like is provided in various image processing devices such as a printer and the like, the present invention can also be applied to an arrangement in which a recording medium is inserted into the reading device to enable the program stored on the recording medium to be read into the image processing device (image forming device, image reading device, etc.) that will execute such program. Namely, because a CPU or one-chip microcomputer or the like is also provided in the printer or the like, in such case, a computer for the purpose of reading programs is present inside the printer.

INDUSTRIAL APPLICATION

As described above, in the image recognition device, the image forming device and the recording medium according to the present invention, even in the case where data that has undergone electronic information conversion is received, and a recognition process is carried out thereon, by supplying a fluctuation to the image data of the recognition object or the dictionary data for carrying out recognition, the probability of carrying out a mis-recognition is reduced, and when a recognition process is carried out at least a plural number of times on the same image data, in the case where an image is not a detection object, it is possible to correctly recognize that the image is not a detection object.

What is claimed is:

1. An image recognition device, comprising:
a fluctuation producing portion which produces fluctuation information for changing recognition results in order to avoid mis-recognition caused by mistakenly recognizing an object that is not a detection object as being a detection object; and
an image recognition portion which carries out an image recognition process on supplied image data by taking into account the fluctuation information produced by said fluctuation producing portion.

2. An image recognition device, comprising:
a fluctuation producing portion which produces fluctuation information for changing recognition results in order to avoid mis-recognition caused by mistakenly recognizing an object that is not a detection object as being a detection object;
a fluctuation superimposing portion which superimposes the fluctuation information produced by said fluctuation producing portion onto supplied image data;
an image recognition portion which carries out an image recognition process on the superimposed image data having fluctuation information superimposed thereon created by said fluctuation superimposing portion; and
an output portion which outputs recognition results of said image recognition portion.

3. An image recognition device, comprising:
a fluctuation producing portion which produces fluctuation information for changing recognition results in order to avoid mis-recognition caused by mistakenly recognizing an object that is not a detection object as being a detection object;
a recognition dictionary for carrying out an image recognition process on supplied image data;
a fluctuation superimposing portion which superimposes the fluctuation information produced by said fluctuation producing portion onto said recognition dictionary;

an image recognition portion which carries out an image recognition process on said supplied image data based on the fluctuation recognition dictionary produced by the fluctuation superimposing portion; and an output portion which outputs recognition results of said image recognition portion.

4. An image forming device equipped with a device main body which carries out a prescribed image conversion process on supplied image data information, and carries out a prescribed printing process, said image forming device comprising:

an image recognition device comprising a fluctuation producing portion which produces fluctuation information for changing recognition results in order to avoid mis-recognition caused by mistakenly recognizing an object that is not a detection object as being a detection object and an image recognition portion which carries out an image recognition process on supplied image data by taking into account the fluctuation information produced by said fluctuation producing portion, wherein image data inputted into the image forming device is inputted into said device main body and said image recognition device; and the suitability of a normal output of said device main body is judged based on recognition results of said image recognition device.

5. A recording medium which can be read by a computer and which stores a program that enables the computer to execute:

a fluctuation producing process which produces fluctuation information for changing recognition results;

a process which acquires image data of a recognition object;

a process which reads out a recognition dictionary for carrying out an image recognition process; and an image recognition process which is carried out on the acquired image data by taking into account said read out recognition dictionary and said produced fluctuation information.

6. An image forming device equipped with a device main body which carries out a prescribed image conversion process on supplied image data information, and carries out a prescribed printing process, said image forming device comprising:

an image recognition device comprising a fluctuation producing portion which produces fluctuation information for changing recognition results in order to avoid mis-recognition caused by mistakenly recognizing an object that is not a detection object as being a detection object, a fluctuation superimposing portion which superimposes the fluctuation information produced by said fluctuation producing portion onto supplied image data, an image recognition portion which carries out an image recognition process on the superimposed image data having fluctuation information superimposed thereon created by said fluctuation superimposing portion; and an output portion which outputs recognition results of said image recognition portion, wherein image data inputted into the image forming device is inputted into said device main body and said image recognition device; and the suitability of a normal output of said device main body is judged based on recognition results of said image recognition device.

7. An image forming device equipped with a device main body which carries out a prescribed image conversion process on supplied image data information, and carries out a prescribed printing process, said image forming device comprising:

an image recognition device comprising a fluctuation producing portion which produces fluctuation information for changing recognition results in order to avoid mis-recognition caused by mistakenly recognizing an object that is not a detection object as being a detection object, a recognition dictionary for carrying out an image recognition process on supplied image data, a fluctuation superimposing portion which superimposes the fluctuation information produced by fluctuation producing portion onto said recognition dictionary, an image recognition portion which carries out an image recognition process on said supplied image data based on the fluctuation recognition dictionary produced by the fluctuation superimposing portion, and an output portion which outputs recognition results of said image recognition portion, wherein image data inputted into the image forming device is inputted into said device main body and said image recognition device; and the suitability of a normal output of said device main body is judged based on recognition results of said image recognition device.

* * * * *